United States Patent
DeWille et al.

(10) Patent No.: US 8,071,145 B2
(45) Date of Patent: Dec. 6, 2011

(54) CONTROLLED GLYCEMIC RESPONSE SWEETENED CEREAL PRODUCT

(75) Inventors: Normanella T. DeWille, Columbus, OH (US); Judith R Atkinson, Powell, OH (US); Neile K. Edens, Columbus, OH (US); Terrence B. Mazer, New Albany, OH (US); Kelley J. Lowe, Powell, OH (US); Douglas J. Wearly, Blacklick, OH (US); Allison Ogilvie, Longmont, CO (US)

(73) Assignee: Abbott Laboratories, Abbott Park, IL (US)

( * ) Notice: Subject to any disclaimer, the term of this patent is extended or adjusted under 35 U.S.C. 154(b) by 595 days.

(21) Appl. No.: 11/851,473

(22) Filed: Sep. 7, 2007

(65) Prior Publication Data

US 2008/0063753 A1    Mar. 13, 2008

Related U.S. Application Data

(60) Provisional application No. 60/842,739, filed on Sep. 7, 2006.

(51) Int. Cl.
*A23G 3/00* (2006.01)

(52) U.S. Cl. ........ 426/103; 426/291; 426/292; 426/293; 426/303; 426/620; 426/658

(58) Field of Classification Search .......... None
See application file for complete search history.

(56) References Cited

U.S. PATENT DOCUMENTS

| | | | |
|---|---|---|---|
| 3,868,471 A * | 2/1975 | Decelles et al. ........ | 426/303 |
| 4,379,171 A | 4/1983 | Furda et al. | |
| 4,857,339 A * | 8/1989 | Maselli et al. ........ | 426/28 |
| 6,248,375 B1 | 6/2001 | Gilles et al. | |
| 6,774,111 B1 | 8/2004 | Wolf et al. | |
| 6,916,796 B2 | 7/2005 | Wolf | |
| 2003/0148008 A1 * | 8/2003 | Robinovitch et al. ........ | 426/306 |
| 2004/0052915 A1 | 3/2004 | Carlson et al. | |
| 2004/0126477 A1 * | 7/2004 | Coleman et al. ........ | 426/620 |
| 2004/0247773 A1 * | 12/2004 | Picquet et al. ........ | 426/660 |
| 2005/0214385 A1 | 9/2005 | Komorowski et al. | |
| 2005/0255218 A1 * | 11/2005 | Green et al. ........ | 426/619 |
| 2006/0127448 A1 | 6/2006 | Carlson et al. | |

OTHER PUBLICATIONS

O'Brien Nabors "Alternative Sweeteners" 2001 Marcel Dekker Inc. 3rd edition pp. 373 and 377 of Book but pp. 6 and 7 of the Scanned document.*
International Starch Institute 1999 (http://www.starch.dk/isi/methods/27DE.htm) pp. 1-4.*
Cargill Product Information on Xtend Sucromalt, www.cargill.com.

* cited by examiner

*Primary Examiner* — Timothy M Speer
*Assistant Examiner* — Felicia C King

(57) ABSTRACT

The present invention provides a food product comprising: a formed reduced glycemic response cereal component; and a non-sticky reduced glycemic response sweetener coating over the formed cereal component, the sweetener coating comprising: a first sticky layer comprising at least about 30% fructose (of the total sweetener coating); a second less sticky layer having a DE value of about 60 or less and comprising up to about 17% fructose and at least about 1% non-fructose carbohydrates (of the total sweetener coating); and third layer comprising crystalline fructose. The present invention also provides a process for forming the sweetener coating over the formed cereal component comprising the following steps: (a) providing a formed cereal component having thereon a first sticky layer comprising fructose; (b) forming over the first sticky layer a less stick second layer comprising non-fructose carbohydrates and optionally fructose; and (c) applying crystalline fructose over the second layer.

33 Claims, 2 Drawing Sheets

CONTROLLED GLYCEMIC RESPONSE SWEETENED CEREAL PRODUCT

This application is related to Provisional Application No. 60/842,739 filed Sep. 7, 2006

BACKGROUND

1. Field of the Invention

The present invention relates to a food product comprising a formed cereal component and a non-sticky reduced glycemic response sweetener coating on the formed cereal component. The present invention further relates a process for forming a non-sticky reduced glycemic response sweetener coating on the formed cereal component.

2. Related Art

If individuals are overweight or are diabetic, high post-meal blood glucose elevations and prolonged blood glucose levels may have a negative impact on health. In addition, a significant number of diabetics are known to be overweight. To avoid elevated blood glucose levels in such at-risk individuals, early dietary regimens limited the intake of dietary carbohydrate because glycemic control was generally better with this type of regimen. However, researchers found that even low-carbohydrate, high-fat diets were associated with dyslipidemias and cardiovascular disease. In 1950, the American Diabetes Association (ADA) recommended increasing the proportion of calories provided by carbohydrate to lower cardiovascular risk. As the medical community gained a greater understanding of diabetes, dietary recommendations continued to evolve by suggesting increased consumption of carbohydrates.

Depending on the chemical composition and the rate of digestion and absorption, carbohydrates may differ in their ability to raise blood glucose levels (i.e., may cause differing glycemic responses). Simple sugars, such as glucose, may be rapidly absorbed by a human and produce an immediate spike in the blood glucose levels of a diabetic or other individual. Even conventional complex carbohydrates may produce such an immediate spike because such carbohydrates are rapidly converted to glucose by enzymatic hydrolysis during the process of digestion. Starches which are resistant to digestion, such as cornstarch, may also be converted to a rapidly digested form upon heating. Thus, a problem to be solved is to supply complex carbohydrates, as well as sweeteners which produce a reduced or blunted glycemic response in diabetics by being gradually converted to glucose and absorbed at a reduced rate.

Having at-risk individuals, such as diabetics and those who are overweight, adhere to a diet which reduces the glycemic response may also be a challenge. Many of the foods suggested for such diets may be unappealing or unappetizing to the individual involved. The formulation of such foods may also present other problems including greatly increased cost, processing challenges, etc. Therefore, there exists a need for food products which provide: (1) a reduced glycemic response; (2) are appealing and appetizing to the individuals who need or would like to consume such products; and (3) do not create other problems such as greatly increased cost, processing challenges, etc.

SUMMARY

According to a first broad aspect of the present invention, there is provided a food product comprising;
 a formed reduced glycemic response cereal component comprising reduced glycemic response carbohydrates, wherein the cereal component reduced glycemic response carbohydrates comprise, based on the total cereal component, up to about 20% fructose; and
 a non-sticky reduced glycemic response sweetener coating over the formed cereal component, the sweetener coating comprising:
  a first sticky layer over the cereal component comprising, based on the total sweetener coating, at least about 30% fructose;
  a second layer over the first layer and being less sticky than the first layer, the second layer having a DE value of about 60 or less and comprising, based on the total sweetener coating, up to about 17% fructose and at least about 1% non-fructose carbohydrates; and
  a non-sticky third layer comprising crystalline fructose over the second layer.

According to a second broad aspect of the invention, there is provided a process comprising the following steps:
 (a) providing a formed reduced glycemic response cereal component comprising reduced glycemic response carbohydrate, wherein the cereal component has thereover a first sticky layer which comprises, based on the total sweetener coating, at least about 30% fructose (solids basis),
 (b) forming over the first layer a second layer which is less sticky than the first layer, the second layer having a DE value of about 60 or less and comprising, based on the total sweetener coating, up to about 17% fructose (solids basis) and at least about 1% non-fructose carbohydrates (solids basis); and
 (c) applying crystalline fructose over the second layer, to thereby provide a non-sticky reduced glycemic response sweetener coating over the cereal component.

BRIEF DESCRIPTION OF THE DRAWINGS

The invention will be described in conjunction with the accompanying drawing, in which.

DETAILED DESCRIPTION

It is advantageous to define several terms before describing the invention. It should be appreciated that the following definitions are used throughout this application.

DEFINITIONS

Where the definition of terms departs from the commonly used meaning of the term applicants intend to utilize the definitions provided below, unless specifically indicated.

For the purposes of the present invention, the term "food product" refers to any product comprising a formed cereal component, a sweetener coating, plus any other edible materials, ingredients, additives, etc. A food product of the present invention may be in various forms such as, for example, a food bar (e.g., cereal-type bar), a ready-to-eat cereal product, etc. Embodiments of the food products of the present invention may comprise, consist of, or consist essentially of the essential elements, materials, components, ingredients, layer, coatings, etc., and limitations described herein, as well as any additional or optional materials, ingredients, additives, components, etc., described herein or otherwise useful in a food product.

For the purposes of the present invention, the term "edible" refers to any material, ingredient, additive, etc., which may be ingested and which is safe for humans to eat.

For the purposes of the present invention, the term "ready-to-eat" (R-T-E) refers to a food product which is essentially ready for human consumption with minimal or no additional preparation such as cooking, heating, etc.

For the purposes of the present invention, the term "cereal" refers to a starchy grain prepared from, obtained from, etc., wheat, oats, nice, corn, barley, etc.

For the purposes of the present invention, the term "formed cereal component" refers to cereal grains, plus any other edible materials such as, for example, other carbohydrate sources (e.g., fructose, mixtures of fructose with other non-fructose carbohydrates, such as glucose, lactose, maltose, sucrose, hydrolyzed or modified starch or cornstarch, maltodextrins, glucose polymers (e.g., polydextrose), rice-derived carbohydrates, indigestible oligosaccharides (e.g., fructooligosaccharides), honey, etc., and combinations thereof), dietary fiber, protein, other optional ingredients, etc., which have been processed, formed, shaped, blended, mixed, combined, etc., into a coherent mass. A formed cereal component may be in the form of flakes, chips, granules, pellets, expanded or puffed forms, particles, crumbs, aggregates, etc., or any combination thereof.

For the purposes of the present invention, the term "glycemic index" (GI) refers to the index calculated by dividing the blood glucose incremental area under the curve (AUC) of a test food by the blood glucose AUC of a reference food and multiplying by 100, wherein the carbohydrate content of test and reference foods are the same. The reference food is typically glucose or white bread which has the standard GI of 100.

Figure 1:
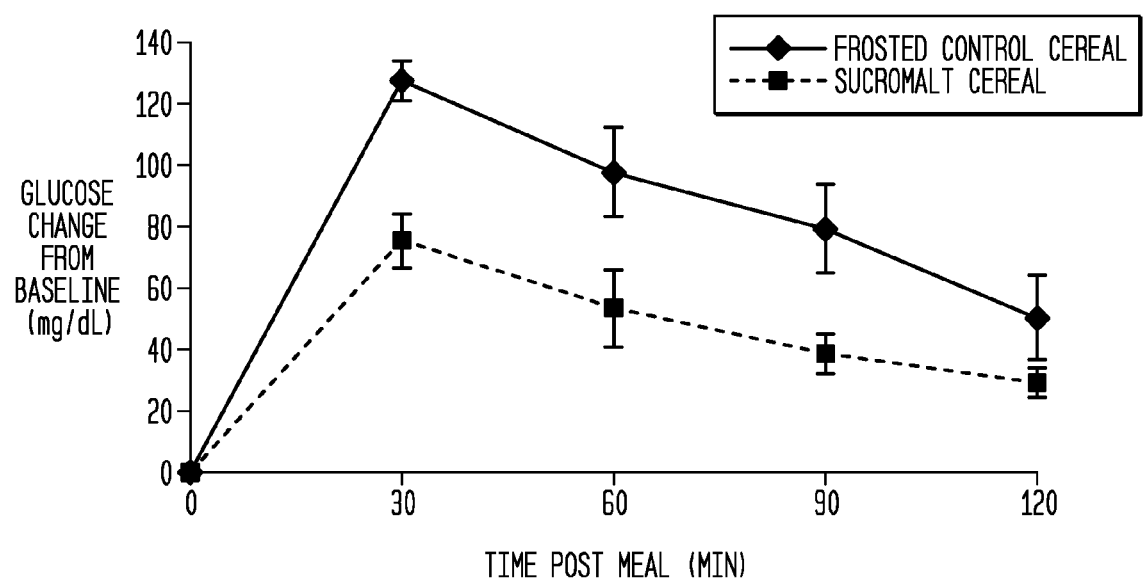
FIG. 1 is a graph comparing the glycemic response of Zucker rats fed an embodiment of a sweetened cereal product according to the present invention (Sucromalt Cereal) and a conventionally sweetened cereal product (Frosted Control Cereal)

For the purposes of the present invention, the terms "reduced glycemic response" and "low glycemic response" refer interchangeably to a food product, component (e.g., carbohydrate), etc., having an at least about 5% statistically significant (p<0.05) decrease in the area under the blood glucose curve during a meal tolerance test compared to a control food product, component, etc., as illustrated, for example, in FIG. 1.

For the purposes of the present invention, the term "sweetener" refers to a composition comprising one or more carbohydrate sugars (e.g., fructose), sugar alcohols, artificial sweeteners, etc., which may impart a recognizable sweet taste to a formed cereal component.

For the purposes of the present invention, the term "reduced glycemic response carbohydrates" refers to a carbohydrate-containing composition which imparts a reduced glycemic response and which comprises at least one carbohydrate which imparts a reduced glycemic response (i.e., fructose, non-fructose reduced glycemic carbohydrate, or a combination thereof). In addition to fructose and other non-fructose reduced glycemic carbohydrates, the reduced glycemic response carbohydrates may comprise other carbohydrates (e.g., glucose maltose, sucrose, etc.), which do not impart a reduced glycemic response. Reduced glycemic response carbohydrates may be formed from mixing, blending or otherwise combining the various carbohydrates, by enzymatically treating sugars (including combinations of sugars and sugar alcohols) to provide the reduced glycemic response carbohydrates, etc. A source of reduced glycemic response carbohydrates includes, for example, compositions comprising sucrose, and another sugar (or a mixture of other sugars) or a sugar alcohol (or mixture of sugar alcohols) having free hydroxyl groups at one or more of carbon positions numbers 2, 3 and 6 (also referred to as the C-2, C-3 and C-6 positions), for example, a sugar mixture of from about 55 to about 70% maltose and from about 30 to about 45% glucose (or other glucose-containing oligomers), which are enzymatically treated with, for example, a glucansucrase enzyme according to published U.S. Patent Application No. 2004/0052915 (Carlson et al.), published Mar. 18, 2004 and published U.S. Patent Application No. 2006/0127448 (Carlson et al.) published Jun. 16, 2006, the entire contents and disclosures of which are herein incorporated by reference. A commercially available example of such an enzymatically treated blend of sucrose and maltose/glucose is distributed by Cargill under the trade name Xtend™ Sucromalt as a reduced glycemic respond syrup and which may comprise 37% fructose, 13% leucrose, 48% higher saccharides and 2% other DP2's (wherein "DP" stands for "degree of polymerization," i.e., DP2 refers to a degree of polymerization of 2). The reduced glycemic response carbohydrates may have a DE value of about 60 or less, more typically a DE value of about 50 or less.

For the purposes of the present invention, the term "reduced glycemic response sweetener" refers to a reduced glycemic response carbohydrate-containing composition which may impart a recognizable sweet taste to a formed cereal component. In addition to the reduced glycemic response carbohydrates, the reduced glycemic response sweetener may comprise sugar alcohols (e.g., maltitol, erythritol, xylitol, sorbitol), artificial sweetener compounds (e.g., saccharine, aspartame, acesulfame K, tagatose, sucralose, etc.), etc.

For the purposes of the present invention, the term "fructose" refers to fructose and sources of readily available fructose, for example, high fructose corn syrup, high fructose corn syrup solids, etc.

For the purposes of the present invention, the term "non-fructose carbohydrates" refers to a carbohydrate other than fructose. These non-fructose carbohydrates may comprise or include non-fructose reduced glycemic response carbohydrates, as well as other non-fructose carbohydrates which do not impart a reduced glycemic response, for example, glucose, maltose, lactose, etc. Non-fructose carbohydrates may also include carbohydrates which comprise or include, in addition to a non-fructose moiety, a fructose moiety, for example, sucrose.

For the purposes of the present invention, the term "non-fructose reduced glycemic response carbohydrates" refers to any non-fructose carbohydrate which imparts a reduced glycemic response. Non-fructose reduced glycemic response carbohydrates may include isomaltulose, leucrose, high amylase starch, modified glucose polymers, resistant starches (Zeta those starches resistant to digestion in the small intestine), etc.

For the purposes of the present invention, the term "dextrose equivalent (DE)" refers to the total amount of reducing sugars present, and is expressed as dextrose on a solids basis. DE values may be determined or measured by AOAC Method 945.66, wherein the Lane and Eynon procedure (AOAC Method 926.09) is used with glucose as the standard, and which is herein incorporated by reference.

For the purposes of the present invention, the term "syrup" refers to an aqueous comprising a sweetener.

For the purposes of the present invention, the term "coating" refers to one or more layers, films, etc., present over, on, etc., the outer or external surface of the formed cereal component.

For the purposes of the present invention, the term "film" refers to a liquid layer comprising dispersed or dissolved solids (e.g., fructose, non-fructose carbohydrates, etc.).

For the purposes of the present invention, the term "crystalline fructose" refers to fructose which is in the form of a crystalline powder, particle, granule, etc. Crystalline fructose useful wherein may have a particle size of at least about 75 microns, and may be in the range of from about 100 to about 850 microns, more typically from about 150 to about 500 microns.

For the purposes of the present invention, the terms "solids basis" and "dry basis" refer interchangeably to the weight percentage of each of the respective solid materials (e.g., fructose, non-fructose carbohydrates, etc.) present in the absence of any liquids (e.g., water).

For the purposes of the present invention, the term "dietary fiber" refers to the sum of the soluble and insoluble fibers. These food components are normally not broken down by the alimentary enzymes of humans to small molecules which are absorbed into the bloodstream.

For the purposes of the present invention, the term "soluble dietary fiber" refers to a fiber source in which at least about 60% of the dietary fiber is soluble dietary fiber as determined by American Association of Cereal Chemists (AACC) Method 32-07.

For the purposes of the present invention, the term "insoluble dietary fiber" refers a fiber source in which at least about 60% of the total dietary fiber is insoluble dietary fiber as determined by AACC Method 32-07.

For the purposes of the present invention, the term "protein" refers to soy protein, milk protein, cereal proteins, other vegetable proteins, etc., or any combination of such proteins.

For the purposes of the present invention, the term "soy protein" refers to any protein that may be derived from soy beans, whether or not the protein is actually derived from soy beans. The term "soy protein" also refers collectively to a mixture of two more soy proteins derived from soy beans. For example, a "soy protein" may be a mixture of soy proteins.

For the purposes of the present invention, the term "sticky" refers to a material, particle, coating, layer, etc., which is tacky, gummy, etc., so as to for an adherent mass or cluster, e.g., forms clumps or causing clumping.

For the purposes of the present invention, the terms "unsticky" or "non-sticky" refer interchangeably to a material, particle, layer, coating, etc., which is not tacky, gummy, etc., and thus does not form an adherent mass or cluster, e.g., does not form clumps or causing clumping.

For the purposes of the present invention, the term "clumping" refers to the adherence of materials, particles, layers, coatings, etc., into a coherent mass or cluster Description A problem with current food products comprising formed cereal components, such as, for example, cereal flakes, is how to sweeten such products without significantly increasing the glycemic response, but while also providing a sweetness impression more like conventional sugars. Some conventional sugars such as sucrose or glucose used to sweeten such products greatly increase the glycemic response. By contrast, non-caloric sweeteners, such as aspartame, may not provide a sweetness impression similar to conventional sugars.

Fructose provides the highest sweetness impression of the conventional sugars, but also imparts less of a glycemic response, especially compared to sucrose or glucose. To further reduce the glycemic response of food products comprising a cereal component sweetened with fructose, the amount of fructose may be reduced in the cereal component. The sweetening effect of the fructose may thus be primarily or exclusively imparted by providing the cereal component with an overlaying sweetener coating comprising fructose. But applying a liquid fructose syrup as a sweetener coating over, on or to the cereal component may impart a noticeable and undesirable level of stickiness to the product. Applying solid crystalline fructose over, on or to the cereal component may avoid imparting such undesirable stickiness to the product, but may not impart the desired sweetness impression, because crystalline fructose may lack adherence to the cereal component, and may thus fall off of the product.

Embodiments of the food product and method of the present invention solve the problems of imparting a reduced glycemic response to a food product comprising a formed cereal component, while also imparting a sufficient sweetness impression to the food product, but without impart-mg undesirable stickiness to the product. These benefits may be achieved by providing a reduced glycemic response sweetener coating over the formed cereal component which comprises at least three layers: (1) a first sticky layer comprising, based on the total sweetener coating, at least about 30% fructose over the cereal component; (2) a second layer having a DE value of about 60 or less (more typically about 50 or less) over the first layer which is less sticky than the first layer and which comprises, based on the total sweetener coating, up to about 17% fructose and at least about 1% non-fructose carbohydrates; and (3) a third layer comprising crystalline fructose over the second layer. This reduced glycemic response sweetener coating may be formed by the following steps: (a) applying a first syrup comprising fructose over the formed cereal component to form the first sticky layer; (b) applying over the first layer a second syrup comprising fructose (optionally) and non-fructose carbohydrates to form a less sticky second layer (e.g., a film); and (c) applying crystalline fructose over the second layer to form a non-sticky third layer.

The glycemic response of an embodiment of a cereal product according to the present invention having a sweetener coating comprising a mixture of fructose and Xtend™ Sucromalt (Sucromalt Cereal), compared to the glycemic response of a conventional flake cereal product having a conventional sweetener (from sucrose) coating (Frosted Control Cereal), is shown in the glycemic response graph of FIG. 1. In carrying out the glycemic response testing shown in FIG. 1, 24.4 gm of the Sucromalt Cereal or the Frosted Control Cereal are ground and mixed with sufficient water to form 1 ml slurry. The slurry is frozen until the glycemic response testing is carried out, at which point the slurry is thawed and remixed with an additional 5 ml water. Twenty male Zucker rats (12 wks old; 0.54 kg body weight) as the test subjects are sorted into two different groups matched for body weight; the rats are fasted overnight before the testing is carried out. One group of rats is fed the Sucromalt Cereal slurry, while the other group of rats is fed Frosted Control Cereal slurry. The slurries are fed (10 ml/kg body weight) to the rats from the end of syringe over approximately 5 minutes. Blood samples are taken by nicking the tip of the rat's tail at 0 time before the slurries are fed) and at 30, 60, 90, 120 minutes afterwards. Blood glucose concentration is measured on a clinical glucose meter, adjusted for the concentration at zero time, and averaged. The resulting data shown in FIG. 1 are presented as mean+/−standard error of the mean. The mean adjusted blood glucose concentrations for both groups of rats are compared at each time point by Student's t-test. As shown in FIG. 1, the glycemic response for the Sucromalt Cereal is significantly lower (p<0.005) compared to the Frosted Control Cereal at all time points.

The food products of the present invention may also comprise dietary fiber. The quantity of dietary fiber present in the food product may vary significantly but will typically range from 3 to 20 w/w % of the carbohydrate system (on a dry weight basis). Dietary fiber is usually not broken down by endogenous enzymes in the human small intestine to small molecules that are absorbed into the bloodstream. Dietary fibers mostly comprise celluloses, hemicelluloses, pectin, gums, mucilages, and lignins.

Fibers differ significantly in their chemical composition and physical structure and therefore their physiological functions. The properties of fibers (or fiber systems) which may impact their physiological function are solubility and fermentability. With regard to solubility, fiber may be divided into soluble and insoluble types based on the fiber's capacity to be solubilized in a buffer solution at a defined pH. Fiber sources may differ in the amount of soluble and insoluble fiber they contain. Representative of soluble dietary fiber sources include gum arabic, sodium carboxymethyl cellulose, guar gum, citrus pectin, low and high methoxy pectin, oat and barley glucans, carrageenan, psyllium, etc. Numerous commercial sources of soluble dietary fibers are available. For example, gum arabic, carboxymethyl cellulose, guar gum, pectin and the low and high methoxy pectins are available from TIC Gums, Inc. of Belcamp, Md. The oat and barley glucans are available from Mountain Lake Specialty Ingredients, Inc of Omaha, Nebr. Psyllium is available from the Meer Corporation of North Bergen, N.J., while the carrageenan is available from FMC Corporation of Philadelphia, Pa. Representative insoluble dietary fibers include oat hull fiber, pea hull fiber soy hull fiber, soy cotyledon fiber, sugar beet fiber, cellulose and corn bran. Numerous sources for the insoluble dietary fibers are also available and known to those skilled in the art. For example, the corn bran is available from Quaker Oats of Chicago, Ill.; oat hull fiber from Canadian Harvest of Cambridge, Minn.; pea hull fiber from Woodstone Foods of Winnipeg, Canada; soy hull fiber and oat hull fiber from The Fibrad Group of LaVale, Md.; soy cotyledon fiber from The Solae Company of St. Louis, Mo.; sugar beet fiber from Delta Fiber Foods of Minneapolis, Minn. and cellulose from the James River Corp. of Saddle Brook, N.J. A more detailed discussion of fibers and their incorporation into nutritional products may be found in commonly assigned U.S. Pat. No. 5,085,883 (Garleb et al.), issued Feb. 4, 1992, the entire contents and disclosure of which is hereby incorporated by reference.

The food products of the present invention may also comprise protein. The protein source may contain intact proteins, hydrolyzed proteins, peptides, amino acids, or any combination thereof. The proteins that may be utilized in the food products include any edible protein suitable for human consumption. Examples of suitable proteins that may be utilized include soy proteins, milk proteins, cereal proteins, other vegetable proteins (e.g., from pea), and mixtures thereof. Commercial protein sources are readily available and known. For example, caseinates, whey, hydrolyzed caseinates, hydrolyzed whey and milk proteins are available from Fonterra of New Zealand Soy and hydrolyzed soy proteins are available from The Solae Company of St. Louis, Mo.

The food products of the present invention may also comprise fat. Suitable fats or sources thereof may include any that are known for or otherwise safe for use in an oral nutritional products, non limiting examples of which include coconut oil, fractionated coconut oil, soybean oil, corn oil, peanut oil, low erucic acid rapeseed oil (canola oil), olive oil, safflower oil, high oleic safflower oil, MCT oil (medium chain triglycerides), sunflower oil, high oleic sunflower oil, sesame seed oil, palm and palm kernel oils, palm olein, marine oils, cottonseed oils, flaxseed oils, cocoa butter, and combinations thereof. Numerous commercial sources for the fats listed above are readily available and known to skilled in the art. For example, soy and canola oils are available from Archer Daniels Midland of Decatur, Ill. Corn, coconut, palm and palm kernel oils are available from Premier Edible Oils Corporation of Portland, Oreg. Fractionated coconut oil is available from Herkel Corporation of LaGrange, Ill. High oleic safflower and high oleic sunflower oils are available from SVO Specialty Products of Eastlake, Ohio. Marine oil is available from Nissui International of Tokyo, Japan. Olive oil is available from Angila Oils of North Humberside, United Kingdom. Sunflower and cottonseed oils are available from Cargill of Minneapolis, Minn. Safflower oil is available from California Oils Corporation of Richmond, Calif.

The fat component may comprise in whole or in part polyunsaturated fatty acids, including polyunsaturated fatty acid esters or other natural or synthetic source, including short chain (less than about 6 carbon atoms per chain), medium chain (from about 6 to 18 carbon atoms per chain) and long chain (having at least about 20 carbon atoms per chain) fatty acids having two or more carbon:carbon double bonds, including n-3 (omega-3) and n-6 (omega-6) polyunsaturated fatty acids. Non limiting examples of polyunsaturated fatty acids suitable for use herein include alpha-linolenic acid (ALA, C18:3n-3), stearidonic acid (C18:4n-3), eicosapentaenoic acid (EPA, C20:5n-3), docosapentaenoic acid (C22:5n-3), docosahexaenoic acid (DHA, C22:6n-3), linoleic acid (C18:2n-6), gamma-linolenic acid (GLA, C18:3n-6), eicosadienoic acid (C20:2n-6), arachidonic acid (ARA, C20-4n-6), di-homo-gamma-linolenic acid (DGLA, C20:3n-6), and combinations thereof.

The food products of the present invention may also comprise a flavorant, concentrations of which may vary substantially depending upon the selected flavorant and other ingredients, as well as the desired flavor profile or intensity desired. Any flavorant that is known or otherwise suitable for use in food products may be used herein, provided that such flavorant is also compatible with the other selected materials, ingredients, additives, etc.

Such flavorants may be natural or synthetic and can be provided by a single or multiple flavored materials. Flavorants for use in the nutritional products are most typically a combination of many ingredients to provide the desired flavor association.

Non-limiting examples of suitable flavorants include enzyme-modified flavors (e.g., dairy flavors), fermentation flavors (e.g. dairy flavors), reaction flavors (e.g., chocolate, caramel), natural extracts (e.g., vanilla, coffee, chocolate), and combinations thereof. Non-limiting examples of other specific flavorants suitable for use herein may include butter pecan flavor, orange, lemon, lime, apricot, grapefruit, yuzu, sudachi, apple, grape, strawberry, pineapple, banana peach, melon, apricot, ume, cherry, raspberry, blueberry, butter, vanilla, tea, coffee, cocoa or chocolate, mint, peppermint, spearmint, Japanese mint, asafetida, ajowan, anise, angelica, fennel, allspice, cinnamon, camomile, mustard, cardamon, caraway, cumin, clove, pepper, coriander, sassafras, savory, Zanthoxyli Fructus, perilla, juniper berry, ginger, star anise, horseradish, thyme, tarragon, dill, capsicum, nutmeg, basil, marjoram, rosemary, bayleaf, wasabi, beef, pork, chicken, fish, crustacean, dried and smoked fish, seaweed, wine, whisky, brandy, rum, gin, liqueur, floral flavors, onion, garlic, cabbage, carrot, celery, mushroom, tomato, and combinations thereof.

The food products of the present invention may further comprise other optional components, materials, ingredients, additives, etc., that may modify the physical, chemical, aesthetic or processing characteristics of the food products. Many such optional components, materials, ingredients, additives, etc., that are known or otherwise suitable for use in other food products may also be used in the food products herein, provided that such optional components, materials, ingredients, additives, etc., are safe for human consumption and are compatible with the essential and other components, materials, ingredients, additives, etc., present in the food product Non-limiting examples of other optional ingredients include preservatives, antioxidants, pharmaceutical actives, colorants, additional flavors, etc.

The food products of the present invention may further comprise vitamins or related nutrients, non-limiting examples of which include vitamin A, vitamin C (e.g., ascorbic acid which may also function as an antioxidant), vitamin D, vitamin E, vitamin K, thiamine, riboflavin, pyridoxine, vitamins $B_1$, $B_2$, $B_{12}$, etc., carotenoids (e.g., beta-carotene, zeaxanthin, lutein, lycopene), niacin, folic acid, pantothenic acid, biotin, choline, inositol, salts/conjugates and derivatives thereof, and combinations thereof.

The food products may further comprise minerals, non-limiting examples of which include iron, phosphorus, magnesium, zinc, manganese, sodium, potassium, molybdenum chromium (e.g. from chromium picolinate), chloride, etc., and combinations thereof.

The food products may further comprise a calcium-containing material, examples of which include any calcium source that is known for or otherwise safe and effective for use in an oral product, including calcium chloride, calcium citrate, calcium malate, calcium citrate malate, calcium carbonate, tricalcium phosphate, and so forth.

The food products of the present invention may also be substantially free of any optional components, materials, ingredients, additives, etc., described herein. In this context, the term "substantially free" means that the selected composition contains less than a functional amount of the optional components, materials, ingredients, additives, etc., including zero percent by weight of such optional components, materials, ingredients, additives, etc.

Embodiments of the food products of the present invention comprise: (1) a formed cereal component; and (2) a reduced glycemic response sweetener coating over the formed cereal component. The formed cereal component of the food products of the present invention may be prepared, formed, etc., in any conventional manner understood by those skilled in the art for preparing cereal products. The formed cereal components may be in the form of flakes, chips, granules, pellets, expanded or puffed forms, particles, crumbs, aggregates, or any other suitable form for cereal products, and may be formed by blending, mixing, extruding, etc., the solid and liquid ingredients. With regard to the solid ingredients, the formed cereal component may comprise carbohydrates (e.g., from cereal grains, sugars, more complex carbohydrates, etc.), proteins, dietary fibers, fats, as well as other optional ingredients such as vitamins, minerals, flavorants, etc. The liquid ingredients used in forming the cereal component may comprise water, as well as water obtained from other sources such as, for example, syrups comprising water and dissolved or dispersed solid ingredients, extracts (e.g., malt extract), etc.

The carbohydrates present in the formed cereal component may comprise carbohydrates which do not impart a reduced glycemic response (e.g., cereal grains, glucose, maltose, sucrose, etc.), reduced glycemic response carbohydrates (e.g., fructose, other non-fructose reduced glycemic response carbohydrates, and combinations thereof), and combinations thereof. For example, to provide a formed cereal component having a reduced glycemic response, the carbohydrates present in the formed cereal component may partially comprise or may consist essentially of (i.e., up to 100%) reduced glycemic response carbohydrates. For example, these reduced glycemic response carbohydrates may comprise from about 1 to about 35% of the formed cereal component, more typically from about 1 to about 25% of the formed cereal component. To increase the sweetness intensity of the food product while maintaining or reducing the glycemic response, the amount of higher sweetness intensity fructose may be reduced in the formed cereal component, relative to amount of fructose in the sweetener coating. For example, the formed cereal component may comprise up to about 20% of the total fructose in the food product, (e.g., in the range of from about 1 to about 20%), and more typically up to about 15% of the total fructose in the food product (e.g., in the range of from about 1 to about 15%). By contrast, the sweetener coating may comprise at least about 80% of the total fructose in the food product (e.g., in the range of from about 80 to about 99%), and more typically at least about 85% of the total fructose in the food product (e.g., in the range of from about 85 to about 99%).

The reduced glycemic response sweetener coating used in embodiments of the food products of the present invention may comprise reduced glycemic response carbohydrates (e.g., fructose, non-fructose reduced glycemic response carbohydrates, non-fructose carbohydrates which do not impart a reduced glycemic response, and combinations thereof), as well as other optional ingredients such as sugar alcohols, artificial sweeteners, flavorants, minerals, vitamins, etc. The reduced glycemic response sweetener coating may partially comprise reduced glycemic response carbohydrates or may consist essentially of (e.g., up to 100%) reduced glycemic response carbohydrates. To increase the sweetness intensity of the food product while maintaining or reducing the glycemic response, the reduced glycemic response sweetener coating may comprise, based on the total sweetener coating, from about 65 to about 98% fructose, more typically from about 75 to about 95% fructose, and from about 2 to about 35%, more typically from about 5 to about 25% non-fructose carbohydrates.

In preparing food products comprising the formed cereal component which are sweetened with the reduced glycemic response sweetener coating, a first syrup comprising, based on the total sweetener coating, at least about 30% fructose (solids basis), more typically at least about 40% fructose (solids basis) is deposited, applied, etc., over, on, to, etc., the formed cereal component to provide, form, etc., a sticky first or inner layer of the sweetener coating. This first syrup may comprise from about 60 to about 99%, more typically from about 75 to about 85% solid ingredients (e.g., fructose), and from about 1 to about 40%, more typically from about 15 to about 25% liquid ingredients (e.g., water). This first syrup may be deposited, applied, etc., over, on, to, etc., the formed cereal component by any suitable method known to those skilled in the art for applying liquid sweetener coatings on formed cereal components, including dipping, spraying, metering, etc. This first sticky layer may provide (solids basis) from about 30 to about 60%, more typically from about 40 to about 50% of the total fructose present in the sweetener coating.

Because the first syrup forms a sticky first layer (due to fructose which is present), a second syrup comprising, based on the total sweetener coating, up to about 17% fructose (solids basis), for example, in the range of from about 1 to about 17% fructose (solids basis), more typically in the range of from about 3 to about 12% fructose (solids basis), and at least about 1% non-fructose carbohydrates (solids basis), for example, in the range of from about 1 to about 28% non-fructose carbohydrates (solids basis), more typically in the range of from about 5 to about 25% non-fructose carbohydrates (solids basis), is also deposited, applied, etc., over, on, to, etc., the first sticky layer to provide, form, etc., a less sticky second or intermediate layer of the sweetener coating. This less sticky second or intermediate layer often provides a film over all or a portion of the first sticky layer. This second syrup may comprise from about 50 to about 99%, more typically from about 65 to about 75% solid ingredients (e.g. a mixture of fructose and non-fructose carbohydrates), and from about 1 to about 50%, more typically from about 25 to about 35% liquid ingredients (e.g., water). This second syrup may be deposited, applied, etc., over, on, to, etc., first sticky layer by any suitable method used to provide the first sticky layer, including dipping, spraying, metering, etc.

To reduce the stickiness of the reduced glycemic response sweetener coating, crystalline fructose is applied over, on, to, etc., the second less sticky layer to provide, form, etc., a non-sticky third or outer layer of the sweetener coating. The crystalline fructose may be applied over a portion of the second less sticky layer, up to the entire second layer. The crystalline fructose may be applied over, on, to, etc., the second less sticky layer to provide, form, etc., a non-sticky third or outer layer by any suitable method known to those skilled in the art for applying solid sweetener coatings on formed cereal components, including sprinkling, metering, etc. This third non-sticky layer may provide (solids basis) from about 30 to about 60%, more typically from about 40 to about 50%, of the total fructose present in the sweetener coating.

Other inclusions may be added to the food products during, for example packaging of the product. These additions may include cut or whole nuts, fruits, etc., such as almonds, raisins, freeze dried fruit pieces, such as strawberries, etc.

Figure 2:
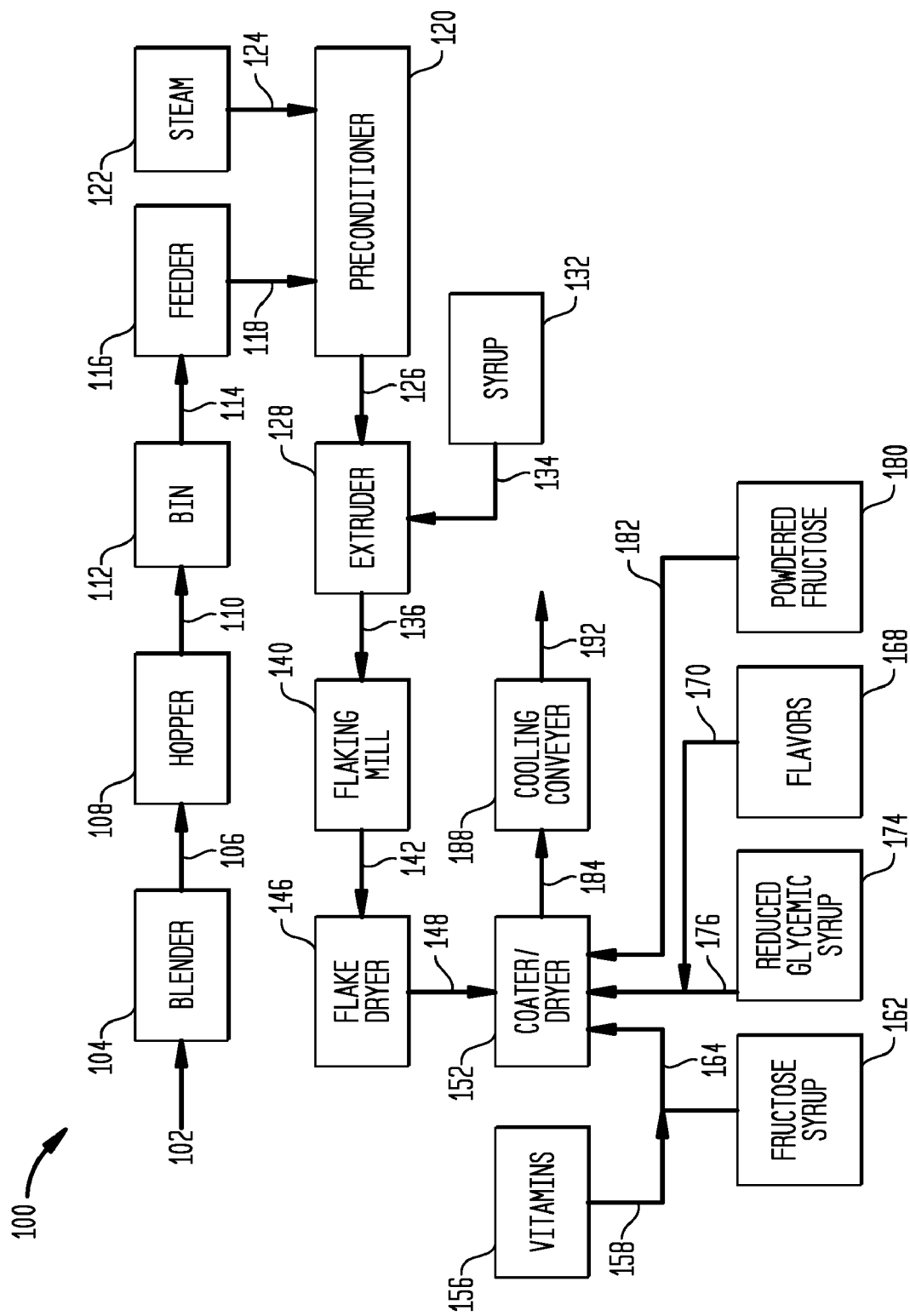
FIG. 2 is a schematic block diagram of an embodiment of a system for preparing a food product according to the present invention having a non-sticky reduced glycemic response sweetener coating.

An embodiment of a system of the present invention for preparing a food product comprising a formed cereal component in the form off for example, extruded cereal flakes, which are coated with a non-sticky reduced glycemic response sweetener coating comprising fructose and reduced glycemic response carbohydrates is illustrated schematically as a block diagram in FIG. 2, and is referred to generally as 100. As shown in FIG. 2, the dry or solid ingredients (e.g., cereal grains, etc.) for preparing the cereal flakes are added, as indicated by arrow 102, to a blender 104 (e.g., a ribbon blender). Blender 104 mixes the solid ingredients to provide a homogeneous mixture.

The mixed solid ingredients in blender 104 may then be transferred (e.g., by an auger), as indicated by arrow 106, to a holding hopper 108. Hopper 108 may hold multiple blends of the solid ingredients so that blender 104 may be emptied to form a new mixture of solid ingredients, thus allowing the system 100 to be continuous in forming the cereal flakes. The solid ingredients in hopper 108 may then be transferred (e.g., by an auger), as indicated by arrow 110, to a surge bin 112.

The solid ingredients in surge bin 112 may then be transferred, as indicated by arrow 114, by, for example, a feeder (e.g., a gravimetric feeder) 116, which may be located vertically below bin 112 so that feeder 116 operates properly. Feeder 116 transfers the solid ingredients, as indicated by arrow 118, to a preconditioner 120, along with steam 122 which is also added, as indicated by arrow 124, to preconditioner 120. Preconditioner 120 mixes the solid ingredients with steam 122 to provide a homogeneous mass or mixture which includes heat and moisture from steam 122.

The mixture of solid ingredients in preconditioner 120 may then be transferred, as indicated by arrow 126, to extruder 128. Syrup 132 which may comprise the liquid ingredients (e.g., reduced glycemic syrup, malt extract syrup, etc.) for preparing the cereal flakes, is also transferred, as indicated by arrow 134, to extruder 128. Extruder 128 mixes and extrudes the coherent mass as, for example, cereal pellets which are then transferred (e.g., by a pneumatic transfer device), as indicated by line 136, to a flaking mill 140 having flaking rolls. The flaking rolls of mill 140 form the extruded pellets into cereal flakes which are then transferred (e.g., by a pneumatic transfer device), as indicated by arrow 142, to a fake dryer (e.g., a fluid bed dryer) 146. After the cereal flakes have been appropriately dried in dryer 1467 the dried flakes are then transferred (e.g., by an inclined belt conveyor), as indicated by arrow 148, to coating applicator and dryer (coater/dryer) 152.

As also shown in FIG. 2, the sweetener coating (plus other coating ingredients) is formed by adding, applying, etc., different portions of the coating ingredients to the cereal flakes in the coater/dryer 152. For example, vitamins 156 (e.g., D, E, $B_1$, $B_2$, $B_{12}$, C, etc.) may be added (e.g., by a metering pump), as indicated by arrow 158. These vitamins 156 may be combined with a fructose syrup 162, which is transferred to coater/dryer 152 (e.g., by a metering pump), as indicated by arrow 164, to apply and form the sticky inner/first sweetener coating layer over, on, to, etc., the cereal flakes. Flavors 168 may also be added (e.g., by a metering pump), as indicated by arrow 170. These flavors 168 may be combined with a reduced glycemic syrup (e.g., Sucromalt) 174, which is transferred to coater/dryer 152 (e.g., by a metering pump), as indicated by arrow 176, to apply and form the less sticky intermediate/second sweetener coating layer coating over, on, to, etc., the sticky inner/first coating layer. Crystalline (e.g. powdered) fructose 180 may transferred (e.g., by a metering screw) from, for example, a hopper, to coater/dryer 152, as indicated by arrow 182, to apply and form the non-sticky outer/third sweetener coating layer over, on, to, etc., the less sticky intermediate second layer, thus completing the sweetener coating on the cereal flakes in coater/dryer 152. The sweetener coated cereal flakes in coater/dryer 152 may then be discharged, as indicated by arrow 184, onto a cooling conveyor 188. The cooled sweetener coated cereal flakes may then be transferred (e.g., by using an inclined belt conveyor), as indicated by arrow 192, from cooling conveyor 188, for packing, distribution, etc., of the finished product. Additions such as such as almonds, raisins, freeze dried fruit pieces, such as strawberries, etc., may be added during packaging using, for example, various metering devices for dry ingredients, weigh belts, etch, for controlling the weight of these additions as a percentage of the contents of the package.

All percentages, parts and ratios as used herein are by weight of the composition, layer, coating, component, mixture, etc., unless otherwise specified. All such weights as they pertain to listed solid ingredients are on a solids basis and, therefore, do not include liquid ingredients (e.g., water), unless otherwise specified.

All numerical ranges as used herein, whether or not expressly preceded by the term "about", are intended and understood to be preceded by that term, unless otherwise specified.

All references to singular characteristics or limitations of the present invention shall include the corresponding plural characteristic or limitation, and vice versa, unless otherwise specified or clearly implied to the contrary by the context in which the reference is made.

All combinations of method or process steps as used herein can be performed in any order, unless otherwise specified or clearly implied to the contrary by the context in which the referenced combination is made.

EXAMPLES

Example I

A reduced glycemic response R-T-E cereal product is prepared from the following ingredients shown in Table 1:

TABLE 1

| Ingredients | Kg/1000 Kg Finished Product* |
|---|---|
| Heavy Wheat Bran | 360.13 |
| Pure Wheat Bran - Hesco | 190.88 |
| Patriot Graham Flour | 167.29 |
| Sucromalt | 163.69 |
| Fructose | 129.28 |
| Corn Bran 60 | 61.97 |
| Malt extract | 27.31 |
| ProFam 974 | 17.72 |
| Salt | 17.72 |
| N&A Vanilla #568340T | 2.06 |
| Corn Oil | 1.49 |
| Fortitech WSV/OSV Premix FT052653 | 0.876 |
| Fortitech UTM/TM premix FT052906 | 0.420 |
| Coviox T30 | 0.237 |

*1,140 lb of ingredients required to manufacture 1,000 lb product

The process for preparing this reduced glycemic response R-T-E cereal is as follows:

A. Preparing Extrudate

The ultratrace and trace minerals (UTM/TM premix) are mixed with a portion of the Patriot Graham Flour in a separate container. The Heavy Wheat Bran, remaining Patriot Graham Flour, Pure Wheat Bran—Hesco, soy protein isolate Pro-FAM 974, Corn Bran 60 and Salt are mixed in a dry-blender for approximately 7 minutes. The UTM/TM and Patriot Graham Flour mixture are then added to the above mixture and the blend is mixed for an additional 7 minutes before forward flow to the extruder. A slurry at approximately 66% total solids consisting of the malt extract, and 78% of a reduced glycemic response sweetener syrup having a DE of about 50 or less (e.g., Cargill's Xtend™ Sucromalt, or a mixture of Cargill's Xtend™ Sucromalt and fructose) is blended with the dry ingredients in a ratio of 3.5/1 dry ingredients/slurry. The complete mixture is extruded through the die and cut into pellets of the proper size and shape B. Flake Drying The extrudate pellets are pressed into approximately 0.040" flakes by forcing them through two rolling cylinders. The flakes are then dried in a Jetzone dryer at approximately 360° F.

C. Syrup Preparation

Two syrups (Syrups 1 and 2) are prepared. Syrup 1 is a combination of water, oil soluble water soluble vitamins (OSV/WSV) premix, half of the fructose and corn oil at 80% total solids. The OSV/WSV premix is blended with a portion of the fructose, and the remainder of the fructose is added to a kettle heated to 150° F. After the fructose is dissolved, the remainder of OSV/WSV/fructose combination is added and allowed to mix for 3 minutes. After mixing, the corn oil is added and allowed to mix for an additional 5 minutes. Syrup 2 comprises the remainder of the a reduced glycemic response sweetener syrup having a DE of about 50 or less (e.g., Cargill's Xtend™ Sucromalt, or a mixture of Cargill's Xtend™ Sucromalt and fructose) mixed with water to achieve 67.8% solids.

D. Coating Flakes

The dried flakes are conveyed to the coating applicator/dryer, coated with Syrups 1 and 2 and sprinkled with crystalline fructose. Syrups 1 and 2 are applied to the flakes at ratios of 81.6/8.1/0.4 Flake/Syrup 1/Syrup 2. The other half of the fructose is sprinkled onto the coated flakes. The coated flakes are dried at approximately 390° F.

All documents, patents, journal articles and other materials cited in the present application are hereby incorporated by reference.

Although the present invention has been fully described in conjunction with several embodiments thereof with reference to the accompanying drawings, it is to be understood that various changes and modifications may be apparent to those skilled in the art. Such changes and modifications are to be understood as included within the scope of the present invention as defined by the appended claims, unless they depart therefrom.

What is claimed is:

1. A food product comprising:
   a formed reduced glycemic response cereal component comprising reduced glycemic response carbohydrates, wherein the cereal component reduced glycemic response carbohydrates comprise, based on the total cereal component, up to about 20% fructose; and
   a non-sticky reduced glycemic response sweetener coating over the formed cereal component, the sweetener coating comprising:
      a first sticky layer over the cereal component comprising, based on the total sweetener coating, at least about 30% fructose;
      a second layer over the first layer and being less sticky than the first layer, the second layer having a DE value of about 60 or less and comprising based on the total sweetener coating, up to about 17% fructose and at least about 1% non-fructose carbohydrates; and
      a non-sticky third layer comprising crystalline fructose over the second layer.

2. The food product of claim 1, wherein the formed cereal component comprises up to about 20% of the total fructose in the food product, and wherein the sweetener coating comprises at least about 80% of the total fructose in the food product.

3. The food product of claim 1, wherein the formed cereal component comprises up to about 15% of the total fructose in the food product and wherein the sweetener coating comprises at least about 85% of the total fructose in the food product.

4. The food product of claim 3, wherein the formed cereal component comprises from about 1 to about 15% of the total fructose in the food product and wherein the sweetener coating comprises from about 85 to about 99% of the total fructose in the food product.

5. The food product of claim 1, wherein the reduced glycemic response carbohydrates comprise from about 1 to about 35% of the formed cereal component.

6. The food product of claim 5, wherein the reduced glycemic response carbohydrates comprise from about 1 to about 25% of the formed cereal component.

7. The food product of claim 1, wherein the sweetener coating comprises, based on the total sweetener coating, from about 65 to about 98% fructose and from about 2 to about 35% non-fructose carbohydrates.

8. The food product of claim 7, wherein the sweetener coating comprises, based on the total sweetener coating, from about 75 to about 95% fructose and from about 5 to about 25% non-fructose carbohydrates.

9. The food product of claim 1, wherein the second layer comprises, based on the total sweetener coating, from about 1 to about 17% fructose, and from about 1 to about 28% non-fructose carbohydrates.

10. The food product of claim 9, wherein the second layer comprises, based on the total sweetener coating, from about 3 to about 12% fructose, and from about 5 to about 25% non-fructose carbohydrates.

11. The food product of claim 9, wherein the fructose and non-fructose carbohydrates in the second layer are provided from an enzymatically treated mixture of sucrose, and a sugar or sugar alcohol having free hydroxyl groups at one or more of carbon positions numbers 2, 3 and 6.

12. The food product of claim 11, wherein the fructose and non-fructose carbohydrates in the second layer are provided from a mixture of sucrose, and a mixture of from about 55 to about 70% maltose and from about 30 to about 45% glucose or other glucose-containing oligomers, enzymatically treated with a glucansucrase enzyme.

13. The food product of claim 9, wherein the second layer has a DE value of about 50 or less.

14. The food product of claim 1, which is in the form of ready-to-eat cereal product.

15. The food product of claim 1, which is in the form of a food bar.

16. A process comprising the following steps:
(a) providing a formed reduced glycemic response cereal component comprising reduced glycemic response carbohydrate, wherein the cereal component has thereover a first sticky layer which comprises, based on the total sweetener coating, at least about 30% fructose (solids basis);
(b) forming over the first layer a second layer which is less sticky than the first layer, the second layer having a DE value of about 60 or less and comprising, based on the total sweetener coating, up to about 17% fructose (solids basis) and at least about 1% non-fructose carbohydrates (solids basis); and
(c) applying crystalline fructose over the second layer, to thereby provide a non-sticky reduced glycemic response sweetener coating over the formed cereal component.

17. The process of claim 16, wherein the first layer of step (a) is formed from a first syrup comprising from about 60 to about 99% solid ingredients and from about 1 to about 40% liquid ingredients.

18. The process of claim 17, wherein the first syrup comprises from about 75 to about 85% solid ingredients and from about 15 to about 25% liquid ingredients.

19. The process of claim 17, wherein the liquid ingredients comprise water.

20. The process of claim 16, wherein the first layer of step (a) is formed from a first syrup comprising, based on the total sweetener coating, at least about 40% fructose (solids basis).

21. The process of claim 20, wherein the first syrup provides, on solids basis, from about 30 to about 60% of the total fructose (solids basis) present in the sweetener coating.

22. The process of claim 21, wherein the first syrup provides from about 40 to about 50% of the total fructose (solids basis) present in the sweetener coating.

23. The process of claim 16, wherein the second layer is formed during step (b) as film over the first layer from a second syrup comprising, based on the total sweetener coating, from about 1 to about 17% fructose (solids basis), and from about 1 to about 20% non-fructose carbohydrates (solids basis).

24. The process of claim 23, wherein the second syrup comprises from about 50 to about 99% solid ingredients and from about 1 to about 50% liquid ingredients.

25. The process of claim 24, wherein the second syrup comprises from about 65 to about 75% solid ingredients and from about 25 to about 35% liquid ingredients.

26. The process of claim 16, wherein the fructose and non-fructose carbohydrates in the second syrup are provided from an enzymatically treated mixture of sucrose, and another sugar or sugar alcohol having free hydroxyl groups at one or more of carbon positions numbers 2, 3 and 6.

27. The process of claim 26, wherein the fructose and non-fructose carbohydrates in the second syrup are provided from a mixture of sucrose, and a mixture of from about 55 to about 70% maltose and from about 30 to about 45% glucose or other glucose-containing oligomers, enzymatically treated with a glucansucrase enzyme.

28. The process of claim 16, wherein the crystalline fructose of step (c) has a particle size of least about 75 microns.

29. The process of claim 28, wherein the crystalline fructose of step (c) has a particle size of from about 100 about 850 microns.

30. The process of claim 29, wherein the crystalline fructose of step (c) has a particle size of from about 150 about 500 microns.

31. The process claim 28, wherein the crystalline fructose of step (c) provides from about 30 to about 60% of the total fructose (solids basis) present in the sweetener coating.

32. The process claim 31, wherein the crystalline fructose of step (c) provides from about 40 to about 50% of the total fructose (solids basis) present in the sweetener coating.

33. A food product made by the process of claim 16.

* * * * *